United States Patent [19]

Kuerten et al.

[11] 4,234,560
[45] Nov. 18, 1980

[54] PROCESS FOR TREATING A LIQUID WITH A GAS AND FOR PREVENTING THE PHASE SEPARATION OF UNREACTED GAS AND LIQUID, IN A CIRCULATORY REACTOR

[75] Inventors: Heribert Kuerten; Otto Nagel, both of Neustadt; Peter Zehner, Ludwigshafen, all of Fed. Rep. of Germany

[73] Assignee: BASF Aktiengesellschaft, Fed. Rep. of Germany

[21] Appl. No.: 838,356

[22] Filed: Sep. 30, 1977

[30] Foreign Application Priority Data

Oct. 9, 1976 [DE] Fed. Rep. of Germany ....... 2645780

[51] Int. Cl.³ .................. B01D 47/02; C01D 15/06
[52] U.S. Cl. ..................... 423/659; 423/DIG. 9; 423/551; 261/77; 261/DIG. 75; 422/224
[58] Field of Search ............ 423/659 R, 551, 104, 423/659, DIG. 13; 261/77, DIG. 75; 422/224

[56] References Cited

U.S. PATENT DOCUMENTS

| | | | |
|---|---|---|---|
| 2,128,311 | 8/1938 | Mertes | 423/104 |
| 2,213,907 | 9/1940 | Fleckenstein et al. | 423/659 |
| 3,723,545 | 3/1973 | Nasel et al. | 261/77 |
| 3,755,452 | 8/1973 | Sinn et al. | 261/77 |
| 3,938,738 | 2/1976 | Nagol et al. | 261/77 |
| 4,000,227 | 12/1976 | Garrett | 261/DIG. 75 |

FOREIGN PATENT DOCUMENTS

| | | | |
|---|---|---|---|
| 208788 | 4/1960 | Austria | 261/77 |
| 962705 | 4/1957 | Fed. Rep. of Germany | 261/77 |
| 1442821 | 12/1968 | Fed. Rep. of Germany | 261/77 |
| 2129564 | 12/1972 | Fed. Rep. of Germany | 261/DIG. 75 |
| 545187 | 6/1956 | Italy | 261/77 |
| 49-40358 | 11/1974 | Japan | 423/551 |
| 327938 | 3/1970 | U.S.S.R. | 261/DIG. 75 |

*Primary Examiner*—O. R. Vertiz
*Assistant Examiner*—Gary P. Straub
*Attorney, Agent, or Firm*—Keil & Witherspoon

[57] ABSTRACT

A process for treating a liquid with a gas in a circulatory reactor, in which the gas is introduced by a jet of liquid into a circulating liquid, is entrained downwards in a tube, rises in an annular space surrounding the tube and—if it has not reacted completely—is again entrained downward over the upper edge of the tube. Using the process according to the invention, a very uniform gas distribution and, in the case of heterogeneous reactions, also a very uniform distribution of the suspended catalyst, is achieved over the entire reaction space.

10 Claims, 1 Drawing Figure

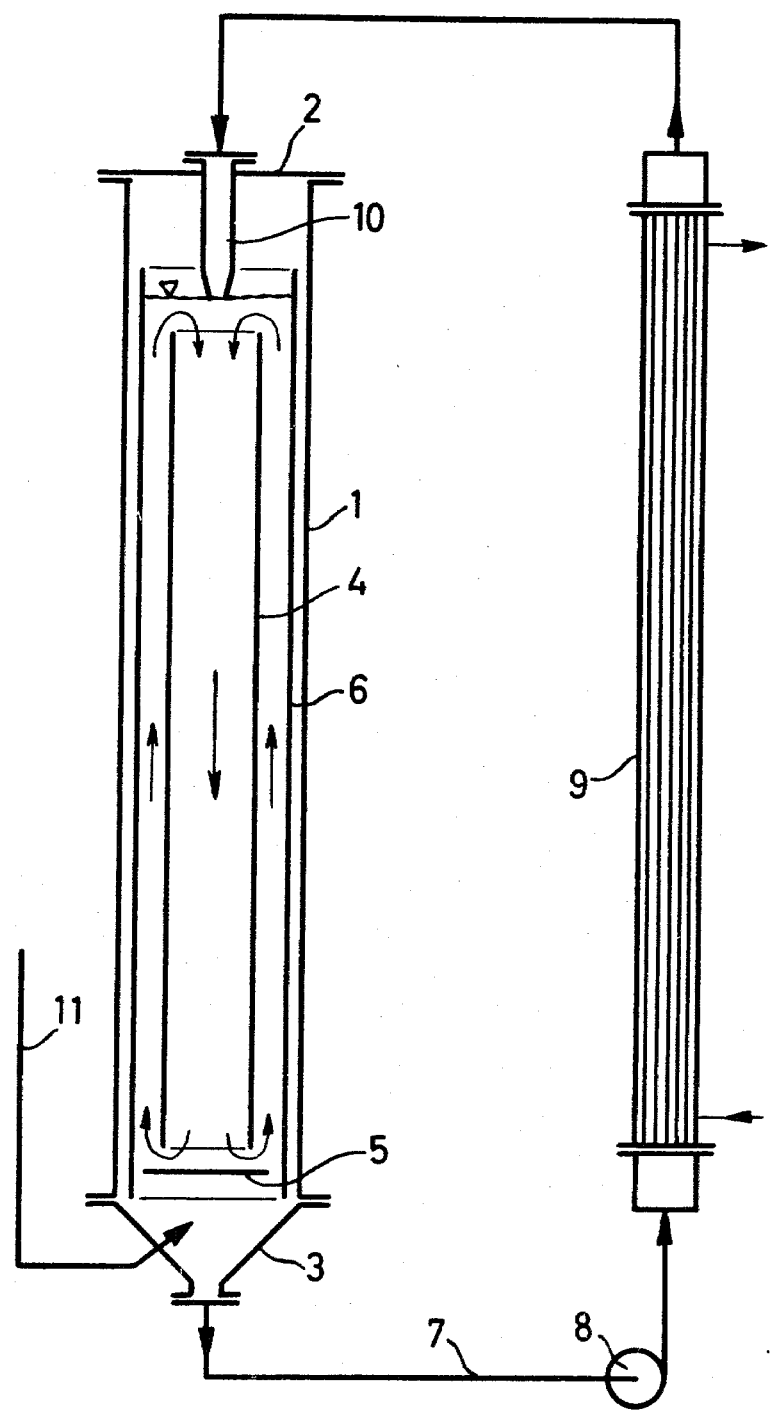

PROCESS FOR TREATING A LIQUID WITH A GAS AND FOR PREVENTING THE PHASE SEPARATION OF UNREACTED GAS AND LIQUID, IN A CIRCULATORY REACTOR

Reactions between a gas and a liquid are common in the chemical industry. In almost all cases, the reaction takes place in the liquid. Hence, the gaseous reactant must first be absorbed in the liquid before a reaction can take place. To permit this transfer of material, an appropriate interfacial area between the gas and the liquid must be set up. The magnitude of this interfacial area depends on the mechanical energy expended in the dispersing process.

The dispersing energy may be provided by, for example, a liquid drive jet. For example, jet reactors with a circulation tube (Chemie-Ingenieur-Technik 37 (1965) 289/294) and injector reactors (German Published Application DAS No. 1,557,018) have been disclosed. The gas is fed to the bottom of the reactor by means of a pump and is dispersed by the liquid jet. The gas rises in the reactor and, to the extent that the gas has not been absorbed, phase separation occurs at the top of the reactor. This process only proves successful if the gas is very soluble and/or if the reaction between the gas and the liquid is so rapid that it accelerates the absorption. Unfortunately, most gases, e.g. oxygen, nitrogen, hydrogen and the like, only have very low solubilities and very rapid reactions are not very common. Accordingly, if a jet reactor is used, large amounts of unreacted gas in most cases escape at the top of the reactor. In order to be able to recycle the gas, compressors, which are very expensive and prone to break down, must be employed.

It is also possible to suck back the gas, and disperse it in the liquid, by means of a multi-stream ejector or a multi-stream jet pump (German Laid-Open Application DOS No. 2,410,570). Ejectors above all have the disadvantage that the compression efficiency is low. The jet must therefore have a very high energy in order to recompress the gas at the top of the reactor against the static pressure of the liquid column.

In addition to these processes used in the art, the use of an immersed jet should also be mentioned. The nozzle for the drive jet is in this case located at the top of the reactor. It is essential that the drive jet should issue into a gas atmosphere, and should travel through the gas for a certain distance, so that when it then impinges on a liquid layer it carries gas into the liquid. Though this principle has been known for a long time (U.S. Pat. No. 2,128,311), it has not found acceptance in the art of introducing gases into reactors. It suffers from the disadvantage that the drive jet is only able to introduce, and to disperse, a relatively small amount of gas, the gas does not penetrate very deeply and hence the residence time, and the amount of gas absorbed, remain low.

It is an object of the present invention to provide a process for treating liquids with gases in which the gas is finely dispersed and is kept in the dispersed state in the liquid until it has finished reacting.

We have found that this object is achieved if gas is introduced into the liquid through one or more downward jets of liquid which issue from one or more nozzles above the circulation tube, is entrained downwards in the circulation tube by a circulating gas-liquid stream, rises in the annular space and—if it has not reacted completely—is very largely again entrained downwards, at the top, over the edge of the circulation tube.

Advantageously, the velocity of the liquid jet is from 5 to 40 m/s, preferably from 10 to 30 m/s, and the flow rate, based on the reactor volume, is from 20 to 200, preferably from 30 to 120, $m^3/m^3/h$. Expressing this rate per $m^3$ and per h provides a measure of the residence time of the circulating liquid in the reactor volume. The velocity of the liquid in the circulation tube should advantageously be from 1 to 6, preferably from 3 to 4, times as great as in the annular space. In this way, the gas content in the circulation tube and in the annular space become comparable and the density differences become small.

In order that the drive jet liquid can be drawn off gas-free at the bottom of the reactor, a deflector plate is located under the circulation tube, the distance of the plate from the said tube being from 0.1 to 0.5, preferably from 0.2 to 0.3, times the diameter of the circulation tube. The amount of gas entering the reactor is automatically regulated, according to the invention, by having the nozzle orifice dipping into the liquid, the orifice being located at a distance above the circulation tube which is from 0.15 to 3 times the diameter of the said tube.

In the case of heterogeneous reactions with a solid catalyst, it is advantageous to suspend, in the reactor, a second tube which forms an annular space between it and the reactor jacket, the cross-sectional area of the space being from 0.05 to 0.2 times the area of the reactor cross-section. This annular space extends from below the deflector plate to above the height of the nozzle orifice. The reaction product free from catalyst can then be withdrawn from this annular space.

The process claimed thus uses a jet drive in which the nozzle points downwards. The drive jet provides the energy for the circulation in the reactor. Since the nozzle orifice is located in the surface of the liquid, the drive jet carries gas present in the gas space above the liquid into the liquid and this gas becomes very finely dispersed in the circulation tube. This results in very little slip between the liquid and the gas, and in a very high rate of circulation. The majority of the gas bubbles which rise in the annular gap between the circulation tube and the reactor wall are entrained by the stream of liquid into the circulation tube. Under equilibrium conditions, the drive jet therefore only introduces as much gas as causes the liquid level to extend to the nozzle orifice. This limits the gas content in the liquid, which can never become so great that there might be a danger of the circulation of the gas-liquid stream in the reactor collapsing as a result of the formation of large bubbles. Accordingly, the advantage of the process according to the invention is that the gas and—in the case of heterogeneous reactions—also the suspended catalyst are uniformly distributed over the entire reaction space. When the reactor is switched off, the drive nozzle cannot become blocked by catalyst which has settled out. The amount of material in the liquid circulation system outside the reactor is relatively small. Because of the low flow velocity in the lower section of the reactor, below the deflector plate, the pump is able to draw off gas-free liquid.

A detailed description of the reactor will be given in relation to FIG. 1. The reactor jacket 1, of internal diameter D, has a height H. The characteristic reactor dimensions are $2 \leq H/D \leq 30$, preferably $5 \leq H/D \leq 10$. The reactor is sealed by an upper lid 2 and a lower lid 3. The circulation tube 4 is located centrally in the reactor. The ratio of the diameter of the circulation tube, $D_U$, to the diameter of the reactor is from 0.7 to 0.1, and preferably is about 0.5. A deflector plate 5 is located below the circulation tube 4. The distance between the deflector plate 5 and the end of the circulation tube 4 is in general from 0.25 to 0.5 $D_U$. In order to be able to draw off catalyst-free reaction product in the case of heterogeneous reactions, it is possible to provide an outer tube 6, the diameter $D_h$ of which is from 0.9 to 0.95 D. This tube extends from below the deflector plate 5 to above the height of the nozzle orifice 10. Instead of this outer tube 6, it is also possible to use an excentrically located tube, of such size that the flow velocity in this tube is less than the rate of sedimentation of the catalyst. At the lower lid 3 of the reactor, liquid is drawn off for the outer circulation system via a line 7, forced by means of a pump 8 through an external heat exchanger 9 and let down, at high velocity, through the central nozzle 10 into the reactor. The nozzle 10 is located above the circulation tube 4. The distance to the upper edge of the circulation tube 4 is from 0.15 to 2 $D_U$. The gas to be dispersed is fed in under the deflector plate 5 through a line 11 and rises from there, in a dispersed form, in the annular space between the circulation tube 4 and the outer tube 6, if present, or the wall of the reactor jacket 1. The small triangle at the upper surface of the liquid is the usual symbol for a normal liquid level.

EXAMPLE 1

A cylindrical reactor having a diameter of 300 mm and a total height of 2,150 mm has a gassed zone of 1,900 mm height, as measured between the deflector plate and the nozzle orifice. The gassed reactor volume is 132 l. A circulation tube of 140 mm diameter is built into the reactor. The distance from the circulation tube to the deflector plate is 70 mm. Bubble-free liquid is drawn off the space under the deflector plate, fed by means of a pump through a heat exchanger and let down, through a nozzle of 12 mm $\phi$ at the top of the reactor, into the said reactor. The nozzle is at a distance of 7 cm from the upper edge of the circulation tube.

The unit is filled with a sodium sulfite solution, of concentration 0.8 mole/l, up to the nozzle orifice. $2.7 \times 10^{-4}$ mole/m$^3$ of CoSO$_4$ is added to the sulfite solution as the catalyst. Liquid is caused to circulate in the reactor by starting the pump. Initially, however, virtually no gassing takes place. The amount circulated by means of the pump is 8 m$^3$/h. The velocity of the jet on leaving the nozzle is 20 m/s. 13.2 l of liquid are now drained out of the reactor. This causes the jet to introduce air. The gas-liquid level rises up to the nozzle orifice. The gas content of the reactor assumes a value of 10%. At the same time the atmospheric oxygen starts to react with the sodium sulfite to give sodium sulfate. The oxygen is replenished by introducing oxygen partly under the deflector plate and partly into the gas space above the nozzle orifice, so as to keep the total pressure in the reactor system, and hence the oxygen concentration, constant with time. The oxygen feed is split in order that the oxygen concentration in the liquid is kept substantially constant even locally. From the oxygen conversion, the area of the interface between gas and liquid is calculated to be 200 m$^2$. The interfacial area relative to the reactor volume is 1,515 m$^2$/m$^3$, the power density being 3,4 kW/m$^3$.

EXAMPLE 2

The same reactor and the same model reaction, as well as the same power density, as in Example 1 are used. When starting up, 26.4 l of liquid are drained off in the present case, so that the gas content of the liquid assumes a value of 20%. The area of the interface between the gas and the liquid is now 380 m$^2$, corresponding to 2,880 m$^2$/m$^3$.

EXAMPLE 3

The experimental conditions are as described in Example 1. However, the gas content in the liquid is increased to 35%. The interfacial area is now only 260 m$^2$, corresponding to 1,970 m$^2$/m$^3$. At this high gas content, large bubbles are already encountered, and these reduce the interfacial area. If the gas content is increased further, the circulation in the reactor breaks down and the interfacial area becomes very small.

We claim:

1. A process for treating a liquid and a gas and substantially preventing phase separation of unreacted gas and liquid in a circulatory reactor containing a liquid-immersed circulation tube, the ratio of reactor height:reactor diameter being 2:1 to 30:1 and the ratio of diameter of the circulation tube:diameter of the reactor being from 0.1:1 to 0.7:1, wherein: the gas is introduced into and finely dispersed in the liquid by one or more jets of liquid which issue from one or more nozzles arranged above the circulation tube with the nozzle orifice positioned at about the level of the circulating liquid; said gas is entrained downwards in the circulation tube by the circulating gas-liquid stream, which exits from the bottom end of said tube and rises in the annular space immediately surrounding the tube, the velocity of the liquid in the circulation tube being from 1 to 6 times as great as the velocity in the annular space; and any gas remaining in the liquid after the liquid rises in the annular space very largely remains entrained in the liquid, which is drawn over the upper edge of the circulation tube from the annular space and thence downward again into the circulation tube.

2. A process as claimed in claim 1, in which the velocity of the liquid jet is from 5 to 40 m/s, and the flow rate, based on the reactor volume, is from 20 to 200 m$^3$/m$^3$/h.

3. A process as claimed in claim 1, in which the liquid is drawn off substantially bubble-free below a deflector plate which is located at a distance of from 0.1 to 0.5 times the diameter of the circulation tube, below the said tube.

4. A process as claimed in claim 1, in which the gas input into the reactor is regulated automatically by having the nozzle orifice dipping into the liquid, the orifice being located at a distance above the circulation tube equal to from 0.15 to 3 times the diameter of the said tube.

5. A process as claimed in claim 1, in which, in the case of heterogeneous catalyses, there is a substantially solid-free withdrawal of the reaction product from a suspended tube which forms, with the reactor wall, an annular space which has a cross-sectional area of from 0.05 to 0.2 times the area of the reactor cross-section and which extends from the deflector bottom plate to above the height of the nozzle orifice.

6. A process as claimed in claim 1, in which the velocity of the liquid jet is from 10 to 30 m/s, and the flow rate, based on the reactor volume, is from 30 to 120 m$^3$/m$^3$/h.

7. A process as claimed in claim 1, in which the velocity of the liquid in the circulation tube is 3-4 times as great as the velocity in the annular space.

8. A process as claimed in claim 1, in which the liquid is drawn off substantially bubble-free below a deflector plate which is located at a distance of from 0.2 to 0.3 times the diameter of the circulation tube, below said tube.

9. A process as claimed in claim 1 wherein the velocity of the liquid jet is from 5 to 40 m/s; the flow rate, based on the reactor volume, is from 20 to 200 m$^3$/m$^3$/h; the velocity of the liquid in the circulation tube is greater than in the liquid velocity in said annular space; the orifice or orifices for the one or more downward jets of liquid are positioned substantially at the upper surface of the liquid in the reactor; and gas which is introduced into the liquid by said one or more jets of liquid is supplied from a gas space in the upper part of the reactor.

10. A process as claimed in claim 9, in which the orifice or orifices for said one or more downward jets of liquid are located at a distance above the circulation tube which is from 0.15 to 3 times the diameter of said circulation tube, and a portion of the liquid is drawn off from the lower part of the reactor and is recycled, after passage through a heat exchanger, to the reactor via said one or more jets of liquid.

* * * * *